Aug. 11, 1942.  T. R. KOMLINE  2,292,571
METHOD OF BURNING DRIED SEWAGE SLUDGE AND APPARATUS THEREFOR
Filed Aug. 31, 1939
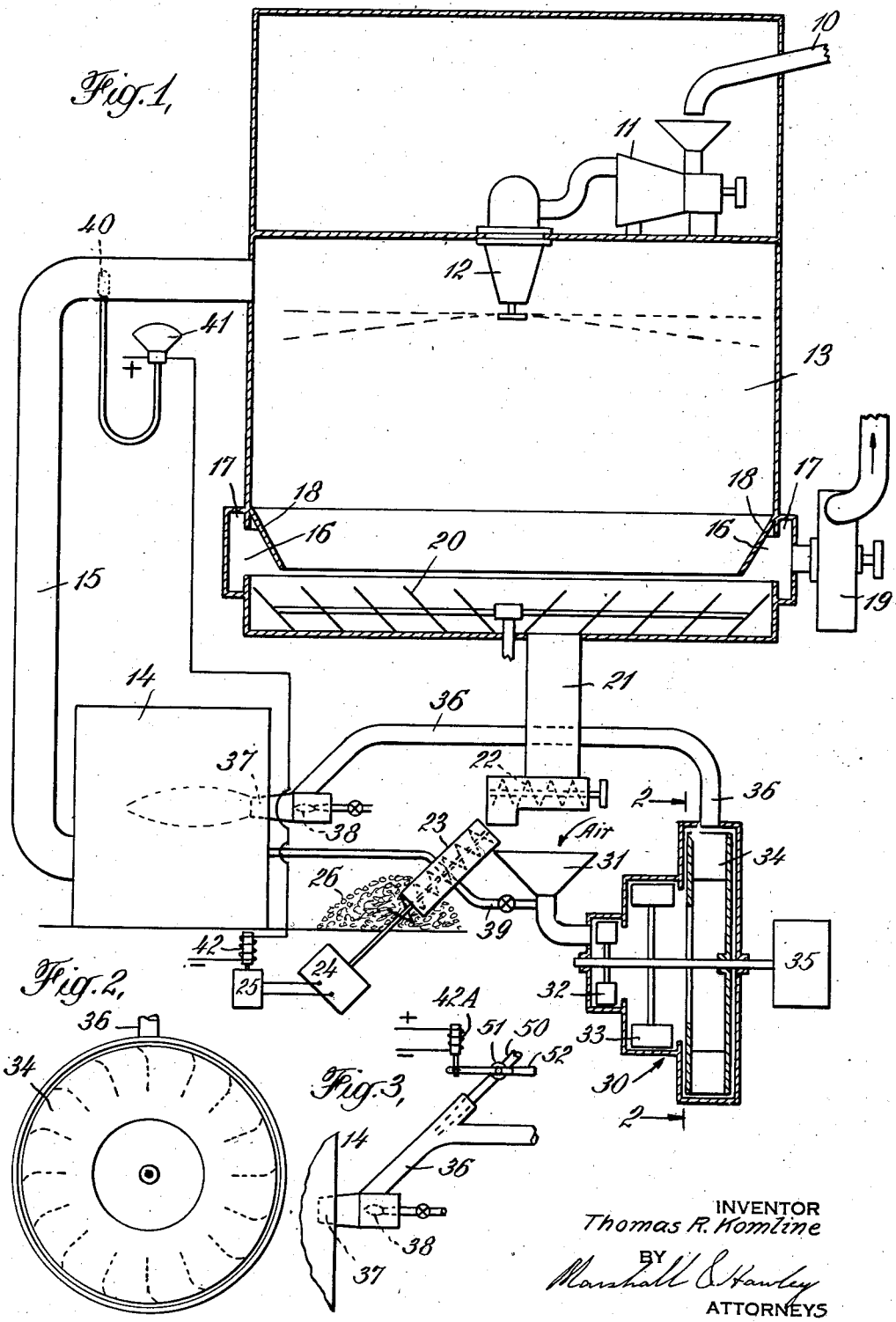
INVENTOR
Thomas R. Komline
BY
Marshall & Hawley
ATTORNEYS Patented Aug. 11, 1942

2,292,571

UNITED STATES PATENT OFFICE 2,292,571

METHOD OF BURNING DRIED SEWAGE SLUDGE AND APPARATUS THEREFOR

Thomas R. Komline, Middlesex, N. J., assignor of one-half to John R. Downes, Borough of Middlesex, N. J.

Application August 31, 1939, Serial No. 292,851

8 Claims. (Cl. 110—7)

This invention relates to improvements in method of burning dried sewage sludge and apparatus therefor.

Its object is to mix the dried sludge and other fuel in predetermined proportions in order to get uniform results and to obtain therefrom a predetermined temperature.

Another object is to vary the proportions of the dried sludge and other fuel during the burning operation to get desired temperatures. My invention also relates to the apparatus for carrying out the aforesaid method, not only for mixing the dried sludge and other fuel in the desired proportions, but for varying the proportions of these ingredients, either automatically or by manipulation.

Further objects relate to refinements in the apparatus to make its operation efficient and such that it may be performed without dust in the operating room.

These and other objects of the invention will appear in the following specification in which I will describe my method and certain embodiments of apparatus for practicing it. The novel features of both the method and apparatus will be set forth in appended claims.

Referring to the drawing,

Fig. 1 is a diagrammatic representation of an apparatus for carrying out my invention;

Fig. 2 is a sectional end elevation of a part of the apparatus shown in Fig. 1, the section being taken on the line 2—2 of the latter figure; and Fig. 3 is a diagrammatic view of a modification of apparatus which also embodies this invention.

Sewage sludge is led through a conduit 10 into a grinder 11 and through a sprayer 12 into a drying chamber 13 where it is subjected to hot gases from a combustion chamber 14 which are led to chamber 13 through a flue 15 at temperatures ranging between 600° and 800° F. The finely comminuted dewatered sludge falls to the floor of chamber 13 and the gases which have been cooled by the spray to between 250° and 300° F., plus the water which has been removed from the sludge in the form of steam are drawn off through exhaust ports 16.

The dried sludge product is sold as a low base fertilizer or is incinerated. It has a heat value of roughly 4000 to 6000 B. t. u.'s per pound and should therefore be burned and its heat utilized in some way, if no satisfactory commercial market for it be found. If the wet sludge can be dewatered to a moisture content below 80% before entering the drying chamber, the heat developed by the combustion of the dride sludge alone is sufficient to dry the wet sludge being sprayed into the chamber 13, but when the moisture content of the wet sludge is over 80%, some auxiliary fuel must be added to maintain the heat balance of the drier. The heat generated in this manner has been utilized to furnish the hot gases for a drying chamber, such as 13.

According to my improved method the dried sludge and the fuel are mixed together in desired proportions which may be varied before they are led to the combustion chamber. Furthermore, the proportions may be changed either automatically or manually during the burning operation. To this end some such apparatus as that which will be described may be used.

20 designates a rake or scraper which rotates on a vertical axis and moves the dried sludge on the floor of chamber 13 into a vertical chute 21 at the base of which is a motor driven screw conveyer 22. The latter discharges the dried sludge into the hopper 31 of a mixer 30.

23 is another screw conveyor driven by a motor 24, the speed of which may be varied by a controller 25. The conveyor 23 moves solid fuel from a pile 26 into the hopper 31. The solid fuel may be coal, coke, dried pitch or any other suitable material.

The dried sludge and solid fuel pass together through the mixer 30 where they are acted upon and broken up by beaters 32 and 33 and pass into and through a propeller and fan 34. The beaters and the fan are driven by a motor 35. The dried sludge and solid fuel thereby become finely divided and intimately mixed and are driven together through a conduit 36 to an ignition nozzle 37 in the combustion chamber 14. The propeller and fan 34 also draw air in through the hopper 31, as indicated by an arrow. This air carries the material through the mixer, makes for dust-free operation and supplies all or part of the air needed for combustion. The volume of air used is determined by the degree of pulverization required, and optimum velocity conditions at the ignition nozzle. 38 is a pilot light within the nozzle 37, supplied with gas and air. As gas is plentiful in a sewage disposal plant it is customary to keep this pilot light burning constantly.

If desired, hot gases may be led from the combustion chamber 14 through a pipe 39 to the base of the hopper of the mixer 30 to preheat the mixture of dried sludge and solid fuel therein.

The hot gases from the combustion chamber pass through flue 15 into the drying chamber 13. From the latter the gases, together with the water removed from the sludge in the form of steam, pass through the ports 16 into an annular chamber 17. Baffles 18 extend over the ports 16 to prevent an excess of the dried sludge from passing into the chamber 17. A blower 19 sucks the gases and the steam from the chamber 17 and discharges them together with any entrained dust into a suitable chimney or flue. By this arrangement no dust or fumes escape into the room where the apparatus is installed.

40 is a thermostat in the flue 15 near the point of its discharge into the drying chamber 13. This is connected to actuate an indicating thermometer 41 which also controls an electric circuit indicated by + and —.

An operator can vary the temperature which is indicated by the thermometer by manipulating the controller 25. By increasing the speed of motor 24, a larger proportion of the solid fuel 26 is delivered to the hopper 31 and the temperature of the gases in flue 15 is raised thereby.

The temperature of the gases in flue 15 may be maintained automatically by means of a solenoid 42 in the electric circuit controlled by the thermometer 41. The solenoid is arranged to actuate the controller 25 to vary the speed of motor 24 to change the rate of feed of the solid fuel according to temperature conditions in flue 15.

By this means the maximum amount of heat derived from the sludge may be utilized with a minimum amount of other fuel.

In the modification illustrated in Fig. 3, 50 designates a pipe for leading oil or other liquid fuel into the combustion nozzle 37. 51 is a valve in the pipe 50 which may be adjusted by a handle 52 or by a solenoid 42A in the electric circuit controlled by the thermometer 41. The operation of this arrangement is obvious and needs no further description.

Other modifications than those shown and described may be made within the spirit and scope of this invention and I intend no limitations other than those imposed by the appended claims.

What I claim is:

1. A mixer, means for moving dried sludge to the mixer, means for moving a solid fuel to the mixer, means for varying the relative rates of the sludge moving means and of the solid fuel moving means, an ignition nozzle, a conduit for leading the dried sludge and the solid fuel from the mixer to the nozzle, and means for utilizing variations in the heat generated by burning the mixture to control automatically the means for varying the relative rates of the sludge moving means and the solid fuel moving means.

2. A mixer having an open inlet, means for moving dried sludge to the mixer, means for moving a solid fuel to the mixer, means for varying the relative rates of the sludge moving means and of the solid fuel moving means, an ignition nozzle, a conduit for leading the dried sludge and the solid fuel from the mixer to the nozzle, said mixer having a fan for drawing in air with the sludge and the solid fuel and propelling the dried sludge, solid fuel and air through the conduit to the nozzle, and means for utilizing variations in the heat generated by burning the mixture to control automatically the means for varying the relative rates of the sludge moving means and the solid fuel moving means.

3. A combustion chamber, a drying chamber, a flue for leading hot gases from the combustion chamber to the drying chamber, means for spraying sludge into the drying chamber, a mixer, means for moving dried sludge from the drying chamber to the mixer, means for moving a solid fuel to the mixer, means for varying the relative rates of the sludge moving means and of the solid fuel moving means, an ignition nozzle in the combustion chamber, a conduit for leading the dried sludge and the solid fuel from the mixer to the nozzle, and means for utilizing variations in the heat generated by burning the mixture to control automatically the means for varying the relative rates of the sludge moving means and the solid fuel moving means.

4. A combustion chamber, a drying chamber, a flue for leading hot gases from the combustion chamber to the drying chamber, means for spraying sludge into the drying chamber, a mixer having an open inlet, means for moving dried sludge from the drying chamber to the mixer, means for moving a solid fuel to the mixer, means for varying the relative rates of the sludge moving means and of the solid fuel moving means, an ignition nozzle in the combustion chamber, a conduit for leading the dried sludge and the solid fuel from the mixer to the nozzle, said mixer having a fan for drawing in air with the sludge and the solid fuel and propelling the dried sludge, solid fuel and air through the conduit to the nozzle, and means for utilizing variations in the heat generated by burning the mixture to control automatically the means for varying the relative rates of the sludge moving means and the solid fuel moving means.

5. A combustion chamber, a drying chamber, a flue for leading hot gases from the combustion chamber to the drying chamber, means for spraying sludge into the drying chamber, a mixer, means for moving dried sludge from the drying chamber to the mixer, means for moving a solid fuel to the mixer, automatic means thermostatically controlled by the temperature of the gases in the flue for varying the relative rates of the sludge moving means and of the solid fuel moving means, an ignition nozzle in the combustion chamber, and a conduit for leading the dried sludge and the solid fuel from the mixer to the nozzle.

6. The method of burning sewage sludge which consists of drying sludge, moving the dried sludge and another fuel independently into a united mixture, the rate of movement of said other fuel being variable, thereafter burning the mixture of dried sludge and other fuel and utilizing variations in the heat of combustion to control automatically the rate of movement of the other fuel.

7. The method of burning sewage sludge which consists of drying sludge, moving the dried sludge and another fuel independently into a united mixture, the rate of movement of said other fuel being variable, introducing air into the mixture of dried sludge and other fuel, directing the mixture and the air to a place where they may be burned, thereafter burning the mixture and utilizing variations in the heat of combustion to control automatically the rate of movement of the other fuel.

8. An ignition nozzle, a conduit for leading a preformed mixture of dried sludge and another fuel to the nozzle where it is burned, means for varying the proportions of the dried sludge and the other fuel in the mixture, and means for utilizing variations in the heat generated by burning the mixture to control automatically said proportion varying means.

THOMAS R. KOMLINE.